United States Patent
Nakagawa et al.

(10) Patent No.: US 10,227,156 B2
(45) Date of Patent: Mar. 12, 2019

(54) LAMINATED METAL SHEET FOR TWO-PIECE CAN AND TWO-PIECE LAMINATED CAN BODY

(71) Applicant: JFE STEEL CORPORATION, Chiyoda-ku, Tokyo (JP)

(72) Inventors: Yusuke Nakagawa, Tokyo (JP); Junichi Kitagawa, Tokyo (JP); Yoichiro Yamanaka, Tokyo (JP); Yoichi Tobiyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 173 days.

(21) Appl. No.: 14/770,640

(22) PCT Filed: Dec. 26, 2013

(86) PCT No.: PCT/JP2013/084794
§ 371 (c)(1),
(2) Date: Aug. 26, 2015

(87) PCT Pub. No.: WO2014/132541
PCT Pub. Date: Sep. 4, 2014

(65) Prior Publication Data
US 2016/0009444 A1    Jan. 14, 2016

(30) Foreign Application Priority Data
Feb. 28, 2013 (JP) .................. 2013-038704

(51) Int. Cl.
| | | |
|---|---|---|
| *B32B 1/02* | (2006.01) | |
| *B32B 15/09* | (2006.01) | |
| *B65D 8/00* | (2006.01) | |
| *B32B 7/00* | (2006.01) | |
| *B32B 7/02* | (2006.01) | |
| *B32B 7/08* | (2006.01) | |
| *B32B 15/00* | (2006.01) | |
| *B32B 15/04* | (2006.01) | |
| *B32B 15/08* | (2006.01) | |
| *B32B 27/06* | (2006.01) | |
| *B32B 27/18* | (2006.01) | |
| *B32B 27/36* | (2006.01) | |
| *B32B 1/00* | (2006.01) | |
| *B32B 1/08* | (2006.01) | |
| *B65D 25/14* | (2006.01) | |

(52) U.S. Cl.
CPC .................. *B65D 7/04* (2013.01); *B32B 1/00* (2013.01); *B32B 1/02* (2013.01); *B32B 1/08* (2013.01); *B32B 7/00* (2013.01); *B32B 7/02* (2013.01); *B32B 7/08* (2013.01); *B32B 15/00* (2013.01); *B32B 15/04* (2013.01); *B32B 15/08* (2013.01); *B32B 15/09* (2013.01); *B32B 27/06* (2013.01); *B32B 27/18* (2013.01); *B32B 27/36* (2013.01); *B65D 25/14* (2013.01); *B32B 2250/00* (2013.01); *B32B 2250/03* (2013.01); *B32B 2250/40* (2013.01); *B32B 2307/536* (2013.01); *B32B 2439/00* (2013.01); *B32B 2439/66* (2013.01); *B32B 2439/70* (2013.01)

(58) Field of Classification Search
CPC ....................................................... B65D 8/00
USPC ......................................................... 428/458
See application file for complete search history.

(56) References Cited

U.S. PATENT DOCUMENTS

| 4,362,775 A | 12/1982 | Yabe | |
|---|---|---|---|
| 5,900,325 A * | 5/1999 | Okamura | ................ B32B 15/08 |
| | | | 428/339 |
| 8,828,512 B2 | 9/2014 | Oshima | |
| 2007/0031688 A1* | 2/2007 | Suzuki | .................... B32B 15/08 |
| | | | 428/458 |
| 2007/0036995 A1* | 2/2007 | Suzuki | ..................... B32B 1/02 |
| | | | 428/458 |

(Continued)

FOREIGN PATENT DOCUMENTS

| CN | 101242916 | 8/2008 |
|---|---|---|
| CN | 101939163 | 1/2011 |

(Continued)

OTHER PUBLICATIONS

Machine English_translation_JP_2009298010_A; Polyester-Resin Coated Metal Sheet for Container; dated Dec. 24, 2009; JPO; whole document.*
Japanese Office Action dated May 12, 2015 for Japanese Application No. 2013-038704, including English translation.
Taiwanese Office Action dated Jun. 4, 2015, application No. 103107124, including English translation.
Chinese Office Action dated Mar. 24, 2016 in Chinese Application No. 201380073942.6, including Concise Statement of Relevance.

(Continued)

*Primary Examiner* — Tahseen Khan
(74) *Attorney, Agent, or Firm* — RatnerPrestia

(57) ABSTRACT

A laminated metal sheet for a two-piece can includes: a metal sheet; and first and second polyester resin layers formed on outer and inner face sides of the container, respectively. The first polyester resin layer contains polyethylene terephthalate or a copolymerized polyethylene terephthalate with a content of a copolymerized component of less than 6 mol % in a ratio of 30% to 60% by mass, polybutylene terephthalate or a copolymerized polybutylene terephthalate with a content of a copolymerized component of less than 5 mol % in a ratio of 40% to 70% by mass, and a polyolefinic wax in an amount of 0.01% to 3.0% in outer percentage, the second polyester resin layer is a copolymerized polyethylene terephthalate with a content of a copolymerized component of less than 22 mol %, and residual degrees of orientation of the first and the second polyester resin layers are less than 30%.

12 Claims, No Drawings

(56) References Cited

U.S. PATENT DOCUMENTS

| | | | |
|---|---|---|---|
| 2007/0142615 A1* | 6/2007 | Crawford | C08G 63/199 528/272 |
| 2008/0261063 A1* | 10/2008 | Yamanaka | B32B 15/08 428/483 |
| 2009/0145898 A1 | 6/2009 | Takatsu | |
| 2010/0243506 A1* | 9/2010 | Cleaver | B65D 25/14 206/524.6 |
| 2010/0310824 A1* | 12/2010 | Oshima | B32B 27/36 428/141 |
| 2013/0224413 A1* | 8/2013 | Prouvost | C08J 7/047 428/35.8 |
| 2014/0162055 A1 | 6/2014 | Kitagawa | |
| 2014/0339123 A1 | 11/2014 | Nakagawa | |
| 2015/0122812 A1 | 5/2015 | Nakagawa | |

FOREIGN PATENT DOCUMENTS

| | | |
|---|---|---|
| EP | 1690675 | 8/2006 |
| EP | 2241437 | 10/2010 |
| JP | 5610451 | 2/1981 |
| JP | 01192546 | 8/1989 |
| JP | 05156040 | 6/1993 |
| JP | 05331302 | 12/1993 |
| JP | 07195617 | 8/1995 |
| JP | 2001335682 | 12/2001 |
| JP | 2002088233 | 3/2002 |
| JP | 2004058402 | 2/2004 |
| JP | 2004168365 | 6/2004 |
| JP | 2004249705 | 9/2004 |
| JP | 2007083709 | 4/2007 |
| JP | 2009184262 | 8/2009 |
| JP | 2009298010 | 12/2009 |
| JP | 2009298010 A1 * | 12/2009 |
| WO | 2007018113 | 2/2007 |
| WO | 2013030972 | 3/2013 |
| WO | 2013099563 | 7/2013 |
| WO | 2013157379 | 10/2013 |

OTHER PUBLICATIONS

International Search Report for International Application No. PCT/JP2013/084794 dated Apr. 8, 2014.

Chinese Office Action dated Nov. 1, 2016 in Chinese Application No. 201380073942.6, including Concise Statement of Relevance of Office Action, 14 pages.

Extended European Search Report for European Application No. 13876472.5-1303 dated Nov. 18, 2015.

Korean Office Action with partial English translation for Application No. 2015-7022518, dated Dec. 21, 2016, 6 pages.

Chinese Office Action for Chinese Application No. 201380073942.6, dated Jun. 1, 2018, with Concise Statement of Relevance of Office Action, 8 pages.

* cited by examiner

LAMINATED METAL SHEET FOR TWO-PIECE CAN AND TWO-PIECE LAMINATED CAN BODY

CROSS REFERENCE TO RELATED APPLICATIONS

This is the U.S. National Phase application of PCT/JP2013/084794, filed Dec. 26, 2013, and claims priority to Japanese Patent Application No. 2013-038704, filed Feb. 28, 2013, the disclosures of each of these applications being incorporated herein by reference in their entireties for all purposes.

FIELD OF THE INVENTION

The present invention relates to a laminated metal sheet for a two-piece can and a two-piece laminated can body.

BACKGROUND OF THE INVENTION

Metal cans, as one form of food packaging containers are excellent in mechanical strength and long-term preservability, can be packed with high-temperature contents as they are and can be hermetically sealed, can be easily subjected to sterilization treatment such as retort sterilization treatment after the hermetic sealing, and are thus highly safe and hygienic as packaging containers. Metal cans have the advantage that they are easily separated and collected from wastes. Metal cans have been conventionally manufactured from coated metal sheets, in which coating processes performed in can manufacturers are, however, complicated and low in productivity. In addition, when a solvent-based coating material is used, a large amount of solvents volatilizes in drying and baking treatment performed after coating, and environmental problems such as discharge of solvents occur. Furthermore, in order to avoid adverse effects of solvents on human bodies, there is a growing move to restrict bisphenol A (BPA) as a type of environmental hormones contained in a coating material.

In view of such a background, in recent years laminated metal sheets with a BPA-free thermoplastic resin film thermally fusion-bonded to a metal sheet surface have been used as a metal can material. Laminated metal sheets with a polyester resin film thermally fusion-bonded to a metal sheet surface in particular are excellent in performance in terms of food sanitation and are thus widely used. Specifically, the laminated metal sheets with a polyester resin film thermally fusion-bonded to a metal surface are used for lids, drawn and redrawn (DRD) cans, drawn and ironed (DI) cans, or the like. The DRD cans and the DI cans have a high degree of processing, and when the laminated metal sheets are used for the DRD cans or the DI cans, the polyester resin film is required to have excellent formability. In view of such a background, Patent Literature 1 and Patent Literature 2, for example, disclose a technique in which a biaxially oriented polyethylene terephthalate film is laminated onto a metal sheet through an adhesive layer formed of a low melting point polyester, which is used as a metal can material. Patent Literature 3 and Patent Literature 4 disclose a method that manufactures a laminated metal sheet and a metal can body with a high drawing ratio using a thermally fusion-bondable polyester resin film.

PATENT LITERATURE

Patent Literature 1: Japanese Laid-open Patent Publication No. 56-10451

Patent Literature 2: Japanese Laid-open Patent Publication No. 01-192546

Patent Literature 3: Japanese Laid-open Patent Publication No. 05-156040

Patent Literature 4: Japanese Laid-open Patent Publication No. 07-195617

Patent Literature 5: Japanese Laid-open Patent Publication No. 05-331302

Patent Literature 6: Japanese Laid-open, Patent Publication No. 2002-88233

Patent Literature 7: Japanese Laid-open Patent Publication No. 2001-335682

Patent Literature 8: Japanese Laid-open Patent Publication No. 2004-58402

Patent Literature 9: Japanese Laid-open Patent Publication No. 2004-249705

SUMMARY OF THE INVENTION

When the laminated metal sheet that is thermally fusion-bonded with a polyester resin film is used on the outer face side of a food canned container, that is, the side being in contact with high-temperature vapor during the retort sterilization treatment, the retort sterilization treatment causes a retort whitening phenomenon, which changes the color of the polyester resin film and impairs design. For this reason, when the laminated metal sheet that is thermally fusion-bonded with a polyester resin film is used on the outer face side of the food canned container, the laminated metal sheet is required to have retort whitening resistance. When the laminated metal sheet that is thermally fusion-bonded with a polyester resin film is used on the inner face side of the food canned container, the laminated metal sheet is required to have corrosion resistance. When the laminated metal sheet is used for food canned containers with a high degree of processing such as drawn cans and drawn and ironed cans, the laminated metal sheet is required to have mechanical properties that enable forming with a high degree of processing such as "drawing" and "drawing and ironing".

According to a study by the inventors of the present invention, however, there have been no laminated metal sheets having both retort whitening resistance and corrosion resistance and having mechanical properties that enable forming with a high degree of processing. Given this situation, it has been desired to develop a laminated metal sheet having retort whitening resistance and corrosion resistance and having mechanical properties that enable forming with a high degree of processing.

Although Patent Literature 5 describes that increasing a crystallization rate of a polymer can suppress the retort whitening phenomenon, the mechanism of the retort whitening phenomenon is not completely determined, and the problem of the retort whitening phenomenon is not completely solved. Patent Literatures 6 to 9 describe metal-sheet covering films for use in drawing and ironing by laminating a film formed of butylene terephthalate and ethylene terephthalate onto a metal sheet. However, such a flat laminated metal sheet is insufficient in processability for use in containers such as food canned containers and may cause defects such as breakage of the film. When a steel sheet, which has higher strength than that of an aluminum sheet, is used as a base material in particular, damage occurs in the film during formation, and the steel sheet cannot be used as a can body.

The present invention has been made in view of the above problems, and an object thereof is to provide a laminated metal sheet for a two-piece can having retort whitening resistance and corrosion resistance and having mechanical properties that enable forming with a high degree of processing and a two-piece laminated can body manufactured by using the laminated metal sheet for a two-piece can.

A laminated metal sheet for a two-piece can according to one aspect of the present invention includes: a metal sheet; a first polyester resin layer formed on a surface of the metal sheet, the surface forming an outer face side of a container after container formation; and a second polyester resin layer formed on a surface of the metal sheet, the surface forming an inner face side of the container after container formation. The first polyester resin layer contains polyethylene terephthalate or a copolymerized polyethylene, terephthalate with a content of a copolymerized component of less than 6 mol % in a ratio of 30% to 60% by mass, polybutylene terephthalate or a copolymerized polybutylene terephthalate with a content of a copolymerized component of less than 5 mol % in a ratio of 40% to 70% by mass, and a polyolefinic wax in an amount of 0.01% to 3.0% in outer percentage, the second polyester resin layer is a copolymerized polyethylene terephthalate with a content of a copolymerized component of less than 22 mol %, and residual degrees of orientation of the first and the second polyester resin layers are less than 30%.

In the laminated metal sheet for a two-piece can according to an embodiment of the present invention, a center line surface roughness Ra of a surface of the first polyester resin layer is within a range of 0.4 μm to 2.0 μm.

A two-piece laminated can body according to an aspect of the present invention is manufactured by using the laminated metal sheet for a two-piece can according to the present invention.

The present invention can provide a laminated metal sheet for a two-piece can having retort whitening resistance and corrosion resistance and having mechanical properties that enable forming with a high degree of processing and a two-piece laminated can body manufactured by using the laminated metal sheet for a two-piece can.

DESCRIPTION OF EMBODIMENTS

The following describes a laminated metal sheet for a two-piece can as an embodiment of the present invention.

Entire Configuration of Laminated Metal Sheet for Two-Piece Can

The laminated metal sheet for a two-piece can as an embodiment of the present invention includes a metal sheet, an outer face side polyester resin layer formed on a surface of the metal sheet, the surface forming an outer face side of a container after container formation, and an inner face side polyester resin layer formed on a surface of the metal sheet, the surface forming an inner face side of the container after container formation.

Configuration of Metal Sheet

For the metal sheet, a steel sheet or an aluminum sheet widely used as can materials can be used, and particularly preferable is tin free steel (TFS), which is a surface-treated steel sheet having a two-layer film in which the lower layer and the upper layer are formed of metal chromium and chromium hydroxide, respectively. Preferable examples of adhesion amounts of metal chromium and chromium hydroxide of the TFS include, but are not limited to, within the range of 70 mg/m$^2$ to 200 mg/m$^2$ for the adhesion amount of metal chromium and within the range of 10 mg/m$^2$ to 30 mg/m$^2$ for the adhesion amount of chromium hydroxide from the viewpoint of processability and corrosion resistance.

Retort Whitening Phenomenon

When the retort sterilization treatment is performed on a can body manufactured by using a metal sheet covered with a general polyester resin film, a phenomenon in which the polyester resin film whitens occurs in many cases. This is because minute voids formed within the polyester resin film irregularly reflect external light. These voids are not formed during heat treatment under a dried condition or during the retort sterilization treatment in an empty can state, which is packed with no contents. When the boundary between the polyester resin film in which whitening occurs and the metal sheet is observed, the voids are not formed across the entire thickness direction of the polyester resin film but are formed mainly near the surface of the metal sheet. From this phenomenon, the voids are considered to be formed by the following mechanism.

Specifically, the can body packed with the contents is exposed to high-temperature, high-pressure vapor immediately after the start of the retort sterilization treatment. During the process, part of the vapor passes through the polyester resin film and goes near the surface of the metal sheet. The can body packed with the contents is cooled by the contents packed before the retort sterilization treatment, and the polyester resin film near the surface of the metal sheet is lower in temperature than that of an ambient atmosphere. For this reason, the water vapor is cooled within the amorphous polyester resin film near the metal sheet to be condensed to water. The condensed water extends the polyester resin film to form water bubbles. Along with the progress of the retort sterilization treatment, these water bubbles are vaporized by a temperature increase of the contents, and the vaporized water bubbles transform into the voids.

The polyester resin film near the metal sheet is cooled by the contents and is thermally fusion-bonded, and the film becomes an amorphous layer, in which crystal orientation breaks down. For this reason, the mechanical strength of the polyester resin film near the metal sheet is lower than that of a crystalline layer and is easily deformed. This fact is considered to cause the above phenomenon. Consequently, the retort whitening phenomenon can be suppressed if the strength of the amorphous layer near the metal sheet can be increased. However, in the thermal fusion-bonding method, manufacture is performed by heating the metal sheet to a high temperature not less than a glass transition point and fusion-bonding the polyester resin film thereonto, and the resin layer near the surface of the metal sheet is fused, by which an oriented crystal inevitably breaks down. Given these circumstances, the present invention makes the amorphous layer, which is low in mechanical strength and fragile immediately after lamination, a hard, strong layer after being formed into a can body, thereby suppressing the retort whitening phenomenon.

Examples of a method for crystallizing the polyester resin film as the amorphous layer before the retort sterilization treatment include a method that performs heat treatment before the retort sterilization treatment. Concerning a case of performing the heat treatment before container formation, a polyester resin film having high crystal orientation is inferior in formability and is thus limited in the form of cans for which the method can be used, which is not realistic. A case of performing the heat treatment after container formation has the disadvantage that an increase in post-formation processes increases manufacturing costs. Given these circumstances, the inventors of the present invention, aiming at increasing crystal orientation by utilizing heat during the retort sterilization treatment, have found a resin composition having a high thermal crystallization rate and have used the resin composition for the outer face side polyester resin layer. In other words, the present invention crystallizes the polyester resin as the amorphous layer before the voids are formed in the resin layer on the can outer face through the retort sterilization treatment and increases strength.

First Polyester Resin Layer

A specific, effective composition for increasing the thermal crystallization rate of a first polyester resin layer formed on a surface of the metal sheet, the surface forming the outer face side of a container after container formation is a polyester composition obtained by mixing a polyester (hereinafter, may be written as a polyester (A)) with polyethylene terephthalate as a main component and a polyester (hereinafter, may be written as a polyester (B)) with polybutylene terephthalate as a main component, the ratio of the polyester (A) being 60% by mass or less and the ratio of the polyester (B) being 40% by mass or more. If the ratio of the polyester (A) exceeds 60% by mass and the ratio of the polyester (B) is less than 40% by mass, the formation of voids near the surface of the metal sheet cannot be suppressed during the retort sterilization treatment, and the resin layer whitens to impair design significantly.

If the ratio of the polyester (A) is less than 30% by mass and the ratio of the polyester (B) exceeds 70% by mass, although the retort whitening phenomenon can be suppressed, the modulus of elasticity of the resin layer excessively decreases to impair mechanical properties, and flaws easily occur in the resin layer during transport or during forming, and suitability for food canned containers is difficult. In addition, the price is too high from the viewpoint of resin cost, which is thus not suitable for practical use. Given these circumstances, in order to ensure drawing processability, drawing and ironing processability, and flaw resistance while suppressing the retort whitening phenomenon in the resin layer on the outer face side after container formation, the ratio in mass % (A/B) between the polyester (A) and the polyester (B) is preferably in the range of 30 to 60/70 to 40 and more preferably in the range of 40 to 50/60 to 50.

The polyester (A) is obtained by a melt condensation reaction with a terephthalic acid component and an ethylene glycol component as main components. Another component may be copolymerized with polyethylene terephthalate in an amount of less than 6 mol % as a range that does not impair the effects of the present invention, and the copolymerized component may be an acid component an alcohol component. Examples of the copolymerized component include aromatic dicarboxylic acids such as isophthalic acid, phthalic acid, and naphthalene dicarboxylic acid; aliphatic dicarboxylic acids such as adipic acid, azelaic acid, sebacic acid, and decane dicarboxylic acid; and alicyclic dicarboxylic acids such as cyclohexane dicarboxylic acid. Among these, isophthalic acid is particularly preferable.

Examples of the copolymerized alcohol component include aliphatic diols such as butanediol and hexanediol and alicyclic diols such as cyclohexane dimethanol. They may be used singly, or two or more of them may be used. The ratio of the copolymerized component is, depending on its type, a ratio so as to give a resulting polymer melting point within the range of 210° C. to 256° C., preferably 215° C. to 256° C., and more preferably 220° C. to 256° C. If the polymer melting point is less than 210° C., heat resistance is poor. If the polymer melting point exceeds 256° C., the crystallinity of the polymer is too high, and forming processability is impaired.

The polyester (B) is obtained by a melt condensation reaction with a terephthalic acid component and a 1,4-butanediol component as main components. Another component may be copolymerized in an amount of less than 5 mol % as a range that does not impair the effects of the present invention, and the copolymerized component may be an acid component or an alcohol component. Examples of the copolymerized acid component include aromatic dicarboxylic acids such as isophthalic acid, phthalic acid, and naphthalene dicarboxylic acid; aliphatic dicarboxylic acids such as adipic acid, azelaic acid, sebacic acid, and decane dicarboxylic acid; and alicyclic dicarboxylic acids such as cyclohexane dicarboxylic acid. Among these, isophthalic acid or 2,6-naphthalene dicarboxylic acid is preferable.

Examples of the copolymerized alcohol component include aliphatic diols such as ethylene glycol and hexane diol and alicyclic diols such as cyclohexane dimethanol. They can be used singly, or two or more of them can be used. The ratio of the copolymerized component is, depending on its type, a ratio so as to give a resulting polymer melting point within the range of 180° C. to 223° C., preferably 200° C. to 223° C., and more preferably 210° C. to 223° C. If the polymer melting point is less than 180° C., crystallinity as polyester is low, resulting in poor heat resistance. The mixing ratio between the polyester (A) and the polyester (B) is adjusted so that the polymer melting point is within the range of 200° C. to 256° C., more preferably 210° C. to 256° C., and more preferably 220° C. to 256° C.

Examples of an olefinic wax to be added include homopolymers and copolymers of olefins, copolymers of olefins and other copolymerizable monomers such as a vinyl monomer, and modified copolymers thereof. Specific examples include polyethylenes (high density, low density low molecular weight, high molecular weight, or the like), linear low density polyethylenes, linear ultra-low density polyethylenes, polypropylenes, ethylene-propylene copolymers, poly-4-methylene-pentene-1, ionomer resins, ethylene-vinyl acetate copolymers, ethylene-acrylic acid copolymers, ethylene-methyl methacrylate copolymers, and modified polyolefins (reaction products of homopolymers, copolymers, or the like of olefins and unsaturated carboxylic acids such as maleic acid and fumaric acid, acid anhydrides, esters, metallic salts, or the like). These olefins can be used singly, or two or more of them can be used mixedly.

In containing the olefinic wax, a low molecular weight wax with a number-average molecular weight (Mn) of 1,000 to 10,000 is effective and preferred. By adding the wax, the surface of the film is appropriately roughened, thereby increasing processability. The content of the olefinic wax is within the range of 0.01% or more and 3.0% or less in terms of a mass ratio to the outer face side polyester resin layer. If the content is less than 0.01%, a less amount of the olefinic wax appears on the resin surface, and processability is poor. If the content exceeds 3.0%, the effect of increasing processability is nearly saturated, followed by technical obstacles in manufacturing and reduction in productivity, leading to an excessive cost increase. For the above reasons, in order to sufficiently cover the resin surface with the olefinic wax and ensure productivity, the olefinic wax is added in an amount within the range of 0.01% or more and 3.0% or less in outer percentage and preferably in an amount within the range of 0.01% or more and 1.0% or less in outer percentage.

In the forming processing of two-piece can bodies with a high degree of processing, the influence of surface frictional resistance during processing is significant. There is a general tendency that lower surface frictional resistance gives higher processability. Ironing in particular draws a film while rubbing the surface of the film, and lower surface frictional resistance gives lower heat generation in processing and subsequent easiness of processing. The inventors of the present invention have aimed at remarkably reducing the surface frictional resistance by adding the olefinic wax to the outer face side polyester resin layer to give irregularities to the surface, resulting in findings that processing stress is reduced to dramatically increase processability. A center line surface roughness Ra of the surface of the outer face side polyester resin layer is preferably 0.4 μm or more and 2.0 μm or less.

Containers such as beverage cans are generally required to have high luster, and the surface of laminated metal sheets for use in such containers is kept smooth. Films for use in such high-luster laminated metal sheets generally have a surface roughness Ra of 0.1 μm or less, and even after lamination the film surface smoothness is kept to have a surface roughness of about 0.1 μm. Such smooth laminated metal sheets are likely to cause defects in the film by drawing and ironing or to reduce adhesion with a base material and thus cannot be used for food cans under severe use conditions. If roughness with a surface roughness exceeding 0.4 μm is given to the surface of the resin layer, a contact area between a mold and the film during forming decreases to reduce surface frictional resistance, and forming resistance is reduced to increase processability. The adhesion between the film and the base material can also be increased, enabling the use for food cans under severe use conditions. It has been found out that there is a tendency that higher surface roughness increases processability, resulting in also an increase in durability. More preferably, the lower limit of the surface roughness is 0.4 μm or more. If the surface roughness exceeds 2.0 μm, film thickness becomes uneven, and film defects or the like easily occur. For this reason, the upper limit of the surface roughness is 2.0 μm or less and more preferably 1.5 μm or less.

Second Polyester Resin Layer

For a second polyester resin layer formed on a surface of the metal sheet, the surface forming the inner face side of the container after container formation, a polyester (a polyester (C)) with polyethylene terephthalate as a main component is formed. The polyethylene (C) is a polymer formed of a dicarboxylic acid component with terephthalic acid as a main component and a glycol component with ethylene glycol as a main component. Examples of the dicarboxylic acid component include terephthalic acid, isophthalic acid, naphthalene dicarboxylic acid, and diphenyl dicarboxylic acid. Among these, terephthalic acid or isophthalic acid is preferably used. The glycol component may contain propanediol, butanediol, or the like with ethylene glycol as the main component.

The main component is polyethylene terephthalate and may copolymerize, with a content of a copolymerized component being less than 22 mol %. The content is preferably less than 18 mol % and more preferably less than 15 mol %. If the content of the copolymerized component is 22 mol % or more, the melting point decreases too much, and residual degrees of orientation of the outer face side and the inner face side polyester resin layers cannot be adjusted to be within a certain range when laminated, resulting in no effect. The ratio of the copolymerized component is, depending on its type, a ratio so as to give a resulting polymer melting point within the range of 210° C. to 256° C., preferably 215° C. to 256° C., and more preferably 220° C. to 256° C. If the polymer melting point is less than 210° C., heat resistance is poor. If the polymer melting point exceeds 256° C., the crystallinity of the polymer is too high, and forming processability is impaired. Antioxidants, heat stabilizers, UV absorbers, plasticizers, pigments, antistatic agents, crystal nucleating agents, or the like may be added as needed.

The above-described inner face side polyester resin layer is excellent in mechanical properties such as tensile strength, the modulus of elasticity, and impact strength and further has polarity, and the inner face side polyester resin layer as the main component can increase the adhesion and formability of the inner face side polyester resin layer up to a level that can withstand container processing and impart impact resistance after the container processing.

Residual Degree of Orientation

An important characteristic of a polyethylene terephthalate laminate film is that an amount of oriented crystals has a large influence on characteristics. The amount of oriented crystals is controlled to an appropriate amount in accordance with required performance by taking advantage of this characteristic, thereby separately producing laminated metal sheets having desired basic performance. Specifically, using a biaxial oriented crystal film, laminate conditions in the thermal fusion-bonding method are precisely controlled, and a residual amount of oriented crystals is controlled.

This method is very industrially convenient, and various product types in accordance with required performance can be separately produced using the same raw materials. Generally, reducing the residual degree of orientation increases formability, whereas increasing the residual degree of orientation increases impact resistance. The present invention, in accordance with a degree of processing required for the use as two-piece cans, controls the residual degree of orientation of a biaxial oriented polyester resin film to be within the preferred range of less than 30%. The residual degree of orientation is a value determined by the X-ray diffraction method and is defined as follows.

(1) For an oriented polyester resin (or an oriented polyester film) before lamination and the resin (or the film) after lamination, X-ray diffraction intensity is measured within the range of $2\theta=20°$ to $30°$.

(2) Pieces of X-ray diffraction intensity at $2\theta=20°$ and $2\theta=30°$ are connected with a straight line, which is defined as a baseline.

(3) The height of the highest peak appearing near $2\theta$=from $22°$ to $28°$ is measured from the baseline.

(4) $P2/P1\times100$ is defined as a residual degree of =orientation (%), where P1 is the height of the highest peak of the film before lamination, and P2 is the highest peak of the film after lamination.

The residual degrees of orientation of the outer face side polyester resin layer and the inner face side polyester resin layer are less than 30%. If the residual degree of orientation is 30% or more, film formability is poor, and body breakage occurs during the manufacture of cans, or problems such as film delamination occur after processing. When a biaxially stretched polyester film is thermally fusion-bonded, the oriented crystals break down by heat from the metal sheet, and the resin layer changes into an amorphous polyester resin. If heat input is small during thermal fusion-bonding, the resin layer is insufficiently fused on the interface with the metal sheet, and the adhesion between the metal sheet and the resin layer is poor. For this reason, it is necessary that the adhesion of the resin layer required when used for food canned containers be ensured and that formability be ensured by reducing the residual degree of orientation to a certain level or less and increasing the ratio of the amorphous polyester resin layer excellent in deformability laminated onto the metal sheet. Consequently, it is necessary that the residual degrees of orientation of the outer face side polyester resin layer and the inner face side polyester resin layer be less than 30% and preferably in the range of 20% or less. From the viewpoint of film formability, it is desirable that, in accordance with a higher degree of processing, the residual degree of orientation be reduced as much as possible. Although no specific lower limit of the residual degree of orientation is set, the residual degree of orientation is preferably 2% or more, because if the residual degree of orientation is less than 2%, impact resistance tends to be poor.

In addition to the compositions of the outer face side polyester resin layer and the inner face side polyester resin layer, in order to attain a balance in the residual degree of orientation in accordance with necessary characteristics, the outer face side polyester resin layer preferably contains polyethylene terephthalate or a copolymerized polyethylene terephthalate obtained by copolymerizing preferably isophthalic acid as an acid component in a ratio of less than 6 mol % as needed, and the inner face side polyester resin layer preferably contains a copolymerized polyethylene terephthalate obtained by copolymerizing preferably isophthalic acid as an acid component in a ratio of less than 22 mol %. The inner face side polyester resin layer is used on the inner face side of a can, and it is copolymerized in order to ensure adhesion.

The outer face side polyester resin layer and the inner face side polyester resin layer are after container formation on the outer face side and the inner face side, respectively, and are required to have the above-described necessary characteristics. The residual degree of orientation is determined so as to exhibit the required characteristics. If the ratios of the amorphous polyester are significantly different between the inner face and the outer face when laminated, the necessary characteristics cannot be satisfied on one side or both sides. In such a case, manufacture with the target residual degrees of orientation satisfying the necessary characteristics of both sides simultaneously is difficult. In other words, the outer face side polyester resin layer and the inner face side polyester resin layer are preferably adjusted in composition so that their residual degrees of orientation are not significantly departed from each other.

The temperature of the metal sheet and the melting point of the resin when laminated have close relation, and the temperature of the metal sheet is determined by the resin melting point. The resin melting point depends on the resin composition; polybutylene terephthalate has a lower melting point than that of polyethylene terephthalate, and the melting point significantly changes depending on the mixing ratio. Isophthalic acid-copolymerized polyethylene terephthalate has a lower melting point than that of polyethylene terephthalate. Consequently, depending on the mixing ratio between the polyester (A) and the polyester (B), the resin melting point of the outer face side polyester resin layer can be sufficiently reduced compared with the resin melting point of the inner face side polyester resin layer, and polyethylene terephthalate that is not copolymerized can be used for the outer face side polyester resin layer.

When the film thicknesses of the outer face side polyester resin layer and the inner face side polyester resin layer are required to be significantly different from each other depending on contents or a method of formation, in order to control the residual degrees of orientation of both the inner face side and the outer face side after lamination, the polyester (A) can be copolymerized with isophthalic acid to adjust the resin melting point. Although there is no specific prescription for the thicknesses of the outer face side polyester resin layer and the inner face side polyester resin layer, when flaws occur by rubbing or the like during formation or when food canned containers are transported, the surface of the metal sheet may be exposed to impair appearance, or corrosion may occur with the exposed part of the metal sheet as a starting point during long-term storage. Given these circumstances, considering the above-described container characteristics and economic efficiency, the thicknesses of the outer face side polyester resin layer and the inner face side polyester resin layer are preferably 10 μm or more and 40 μm or less. If the thicknesses are less than 10 μm, corrosion resistance may not be ensured. If the thicknesses exceed 40 μm, an excessive cost increase in manufacture is brought about.

Although there is no specific limitation on a method for manufacturing the outer face side polyester resin layer and the inner face side polyester resin layer, for example, the respective polyester resins are dried as needed, and one of them and/or each of them is supplied to a known melt lamination extruder, is extruded in a sheet shape from a slit-shaped die, is brought into intimate contact with a casting drum by a process of static electricity application or the like, and is cooled and solidified to be a non-stretched sheet. The non-stretched sheet is then stretched in the longitudinal direction and the width direction of the film to obtain a biaxially stretched film. A stretch ratio can be freely set in accordance with the degree of orientation, the strength, the modulus of elasticity, or the like of a target film. The method for manufacturing is preferably a tenter process in view of film quality, and preferably a successive biaxial stretch process including a stretch in the longitudinal direction followed by a stretch in the width direction and a simultaneous biaxial stretch process including nearly simultaneous stretches in the longitudinal direction and the width direction.

Examples of a method for manufacturing the laminated metal sheet include, but are not limited to, a method that heats a metal sheet at a temperature exceeding the melting point of a film, brings resin films into contact with both sides thereof, and thermally fusion-bonds the resin films thereonto using pressure rolls (hereinafter referred to as laminate rolls). Laminate conditions are appropriately set so that resin layers prescribed by the present invention can be obtained. For example, the temperature of the metal sheet during lamination is preferably 160° C. or more, and a contact time at the melting point of the film or more is preferably in the range of 1 msec to 20 msec as a temperature history that the film undergoes during lamination.

In order to achieve such laminate conditions, cooling during adhesion is required in addition to high-speed lamination. Although there is no specific prescription for pressurizing during lamination, the pressure as a surface pressure is preferably from 0.098 MPa to 2.94 MPa (from 1 kgf/cm$^2$ to 30 kgf/cm$^2$). If the surface pressure is too low, even if the temperature of the interface of the resin reaches a temperature at or higher than the melting point, the time is short, and sufficient adhesion cannot be obtained. If the surface pressure is high, although there is no inconvenience on the performance of the laminated metal sheet, force acting on the laminate rolls is large, and strength in terms of equipment is required, which leads to an increase in the size of an apparatus and is thus uneconomical.

EXAMPLES

In each of examples, degreasing, pickling, and chromium plating treatment were performed on a steel sheet with a thickness of 0.20 mm subjected to cold rolling, annealing, and temper rolling to produce a chromium-plated steel sheets (TFS). In chromium plating treatment, the chromium plating treatment is performed with a chromium plating bath containing $CrO_3$, $F^-$, and $SO_4^{2-}$, and after intermediate rinsing, electrolysis was performed with a chemical conversion treatment liquid containing $CrO_3$ and $F^-$. In this situation, electrolysis conditions (current density, quantity of electricity, or the like) were adjusted to adjust adhesion amounts of metal chromium and chromium hydroxide to be 120 mg/m² and 15 mg/m² in terms of Cr, respectively.

Next, the chromium-plated steel sheet was heated using a metal sheet covering apparatus, and resin films of Inventive Examples 1 to 25 and Comparative Examples 1 to 11 listed in Table 1 below were laminated through thermal fusion-bonding so that the outer face side polyester resin layer (an outer face side resin layer) and the inner face side polyester resin layer (an inner face side resin layer) are formed on one and the other sides, respectively, of the chromium-plated steel sheet by the laminate rolls to manufacture a laminated metal sheet. The laminate rolls are of an internal water-cooling type, and cooling water was forcedly circulated during lamination to perform cooling during film adhesion. Characteristics of the laminated steel sheet and the films on the laminated steel sheet were evaluated by the following methods. PET and PET/I in Table 1 represent polyethylene terephthalate and isophthalic acid-copolymerized polyethylene terephthalate, respectively.

Concerning drawing and ironing, a paraffin wax with a melting point of 45° C. was applied to both sides of the laminated steel sheet in an amount of 50 mg/m², and a blank with a diameter of 123 mm was punched out therefrom. The blank was drawn and formed into a cup with an inner diameter of 71 mm and a height of 36 mm by a commercially available cupping press. The cup was then charged into a commercial DI forming apparatus, and by redrawing and three-stage ironing with a punch speed of 200 mm/s and a stroke of 560 mm, a total reduction rate of 50% (with reduction rates of the respective steps of 30%, 19%, and 23%) was achieved to finally form a can with a can inner diameter of 52 mm and a can height of 90 mm. During DI forming, tap water was circulated at a temperature of 50° C.

The residual degree of crystal orientation is a value determined by the X-ray diffraction method and is defined as follows.

(1) For an oriented polyester resin (or an oriented polyester film) before lamination and the resin (or the film) after lamination, X-ray diffraction intensity is measured within the range of $2\theta=20°$ to $30°$.

(2) X-ray diffraction intensity values at $2\theta=20°$ and $2\theta=30°$ are connected with a straight line, which is defined as a baseline.

(3) The height of the highest peak appearing near $2\theta=$ from $22°$ to $28°$ is measured from the baseline.

(4) $P2/P1 \times 100$ is defined as a residual degree of orientation (%), where P1 is the height of the highest peak of the film before lamination, and P2 is the highest peak of the film after lamination.

The center line surface roughness Ra was measured in conformity with JIS-B0601 using a surface roughness measuring instrument SE-30D manufactured by Kosaka Laboratory Ltd. with a cut-off value of 0.8 mm and a measurement length of 2.4 mm. Measurement was performed at respective three points in the longitudinal direction and the width direction of a film, and the average value of the Ra values was determined to be the Ra value of the film.

TABLE 1

| | Outer face side resin layer | | | | | | | Inner face side resin layer | | | |
|---|---|---|---|---|---|---|---|---|---|---|---|
| | Polyester (A) | | Weight ratio between polyester (A) and (B) | | Added amount of polyolefin (% in outer percentage) (%) | Ra (µm) | Resin film thickness (µm) | Residual degree of orientation (%) | Polyester (C) | | Resin film thickness (µm) | Residual degree of orientation (%) |
| | Main component | Copolymerization ratio (mol %) | (A) | (B) | | | | | Main component | Copolymerization ratio (mol %) | | |
| Inventive Example 1 | PET | 0 | 40 | 60 | 1.0 | 0.48 | 18 | 25 | PET/I | 12 | 28 | 18 |
| Inventive Example 2 | PET | 0 | 40 | 60 | 2.0 | 0.68 | 18 | 25 | PET/I | 12 | 28 | 18 |
| Inventive Example 3 | PET | 0 | 40 | 60 | 1.0 | 1.01 | 18 | 12 | PET/I | 12 | 28 | 5 |
| Inventive Example 4 | PET | 0 | 40 | 60 | 1.5 | 1.17 | 18 | 10 | PET/I | 12 | 28 | 4 |
| Inventive Example 5 | PET | 0 | 40 | 60 | 1.0 | 1.25 | 18 | 5 | PET/I | 12 | 28 | 2 |
| Inventive Example 6 | PET | 0 | 40 | 60 | 0.8 | 1.14 | 18 | 5 | PET/I | 12 | 25 | 2 |
| Inventive Example 7 | PET | 0 | 40 | 60 | 0.8 | 1.01 | 18 | 12 | PET/I | 12 | 25 | 6 |
| Inventive Example 8 | PET | 0 | 40 | 60 | 0.5 | 0.84 | 18 | 8 | PET/I | 12 | 25 | 3 |
| Inventive Example 9 | PET | 0 | 40 | 60 | 0.3 | 0.67 | 18 | 7 | PET/I | 12 | 25 | 2 |
| Inventive Example 10 | PET/I | 5 | 40 | 60 | 1.0 | 1.61 | 18 | 5 | PET/I | 12 | 28 | 2 |
| Inventive Example 11 | PET/I | 3 | 40 | 60 | 1.0 | 1.45 | 18 | 5 | PET/I | 12 | 28 | 2 |
| Inventive Example 12 | PET/I | 3 | 40 | 60 | 0.8 | 1.37 | 18 | 5 | PET/I | 12 | 28 | 2 |
| Inventive Example 13 | PET | 0 | 40 | 60 | 1.0 | 1.47 | 18 | <1 | PET/I | 12 | 25 | <1 |

TABLE 1-continued

| | Outer face side resin layer | | | | | | | Inner face side resin layer | | | |
|---|---|---|---|---|---|---|---|---|---|---|---|
| | Polyester (A) | | Weight ratio between polyester (A) and (B) | | Added amount of polyolefin (% in outer percentage) | Ra | Resin film thickness | Residual degree of orientation | Polyester (C) | | Resin film thickness | Residual degree of orientation |
| | Main component | Copolymerization ratio (mol %) | (A) | (B) | (%) | (μm) | (μm) | (%) | Main component | Copolymerization ratio (mol %) | (μm) | (%) |
| Inventive Example 14 | PET | 0 | 50 | 50 | 1.0 | 0.92 | 18 | 14 | PET/I | 12 | 28 | 5 |
| Inventive Example 15 | PET | 0 | 35 | 65 | 1.0 | 0.88 | 18 | 10 | PET/I | 12 | 28 | 4 |
| Inventive Example 16 | PET | 0 | 40 | 60 | 1.0 | 0.97 | 18 | 10 | PET/I | 6 | 28 | 8 |
| Inventive Example 17 | PET | 0 | 35 | 65 | 1.0 | 1.11 | 18 | 9 | PET/I | 6 | 28 | 6 |
| Inventive Example 18 | PET | 0 | 30 | 70 | 1.0 | 1.12 | 18 | 5 | PET/I | 12 | 28 | 2 |
| Inventive Example 19 | PET | 0 | 60 | 40 | 1.0 | 0.98 | 18 | 8 | PET/I | 12 | 28 | 3 |
| Inventive Example 20 | PET | 0 | 40 | 60 | 0.01 | 0.88 | 18 | 10 | PET/I | 12 | 28 | 4 |
| Inventive Example 21 | PET | 0 | 40 | 60 | 3.0 | 1.01 | 18 | 9 | PET/I | 12 | 28 | 4 |
| Inventive Example 22 | PET | 0 | 40 | 60 | 1.0 | 0.40 | 18 | 10 | PET/I | 12 | 28 | 4 |
| Inventive Example 23 | PET | 0 | 40 | 60 | 1.0 | 2.00 | 18 | 8 | PET/I | 12 | 28 | 3 |
| Inventive Example 24 | PET | 0 | 40 | 60 | 1.0 | 0.72 | 18 | 29 | PET/I | 12 | 28 | 29 |
| Inventive Example 25 | PET | 0 | 40 | 60 | 1.0 | 0.55 | 18 | 10 | PET/I | 21 | 28 | <1 |
| Comparative Example 1 | PET | 0 | 40 | 60 | 0.5 | 0.33 | 18 | 45 | PET/I | 12 | 28 | 35 |
| Comparative Example 2 | PET | 0 | 40 | 60 | 0.0 | 0.38 | 18 | 26 | PET/I | 12 | 28 | 20 |
| Comparative Example 3 | PET | 0 | 40 | 60 | 0.0 | 0.19 | 18 | 40 | PET/I | 12 | 28 | 33 |
| Comparative Example 4 | PET | 0 | 40 | 60 | 1.0 | 0.92 | 18 | 20 | PET | 0 | 25 | 55 |
| Comparative Example 5 | PET | 0 | 40 | 60 | 1.0 | 0.25 | 18 | 33 | PET/I | 23 | 25 | <1 |
| Comparative Example 6 | PET | 0 | 40 | 60 | 2.0 | 1.34 | 18 | 11 | PET | 0 | 25 | 50 |
| Comparative Example 7 | PET | 0 | 20 | 80 | 1.0 | 1.40 | 18 | 8 | PET/I | 12 | 28 | 5 |
| Comparative Example 8 | PET | 0 | 100 | 0 | 1.0 | 0.12 | 18 | 36 | PET/I | 12 | 28 | 5 |
| Comparative Example 9 | PET | 0 | 100 | 0 | 2.0 | 0.33 | 18 | 37 | PET/I | 12 | 28 | 5 |
| Comparative Example 10 | PET | 0 | 100 | 0 | 2.0 | 0.45 | 18 | 31 | PET/I | 12 | 28 | <1 |
| Comparative Example 11 | PET/I | 12 | 100 | 0 | 1.0 | 1.57 | 19 | <1 | PET/I | 12 | 28 | <1 |

*PET: Polyethylene terephthalate
PET/I: Isophthalic acid-copolymerized polyethylene terephthalate (1) Drawing and Ironing Formability Drawing and ironing formability was evaluated based on the presence or absence of body breakage after forming by marking an example in which body breakage occurred after drawing and ironing with D and marking an example manufacturable as a can with A. The following evaluations (2) to (5) were performed on only samples manufacturable as a can.

(2) Outer Face Coverability (Soundness of Can Outer Face Film after Forming)

Outer face coverability was evaluated by the soundness of a can outer face film after forming (an example with less defects is favorable). Specifically, for a drawn and ironed can after being washed and dried, a scratch was made on a can mouth by a file so that a current could be passed through the steel sheet of the drawn and ironed can, and the drawn and ironed can was put in a container (slightly larger than the drawn and ironed can) containing an electrolytic solution (a 1% NaCl solution with a temperature of 25° C.) with the base of the drawn and ironed can directed downward so that only the outer face of the can was in contact with the electrolytic solution. Subsequently, the outer face coverability was evaluated based on a current value measured when a voltage of 6 V was applied across the can body and the electrolytic solution in accordance with the following criteria.

D: exceeding 5 mA
C: exceeding 0.5 mA and 5 mA or less
B: exceeding 0.05 mA and 0.5 mA or less
A: less than 0.05 mA (3) Outer Face Retort Whitening Resistance A resin-laminated steel sheet was drawn and ironed to produce a can, in which water was packed as contents and a lid was seamed. Subsequently, the can was placed in a retort sterilization furnace with the can bottom directed downward, and the retort sterilization treatment was performed at 125° C. for 90 minutes. After the treatment, changes in the appearance of the can bottom were visually observed in accordance with the following criteria.

B: no change in appearance
C: faint tarnish occurring in appearance
D: cloudiness in appearance (the occurrence of whitening)

(4) Inner Face Corrosion Resistance (Soundness of Can Inner Face Film after Forming)

Concerning the soundness of a can inner face film (an example with less defects is favorable), for a drawn and ironed can after being washed and dried, a scratch was made on a can mouth by a file so that a current could be passed through the steel sheet of the drawn and ironed can, and an electrolytic solution (a 1% NaCl solution with a temperature of 25° C.) was poured into the can up to the can mouth. Subsequently, a voltage of 6 V was applied across the can body and the electrolytic solution. The corrosion resistance was evaluated based on a current value in accordance with the following criteria.

D: exceeding 1 mA
C: exceeding 0.1 mA and 1 mA or less
B: exceeding 0.01 mA and 0.1 mA or less
A: less than 0.01 mA (5) Inner Face Impact Resistance A can was filled with tap water at room temperature, and a lid was seamed to hermetically seal the can. Ten cans were dropped onto a polyvinyl chloride floor from a height of 1.25 m for each test, and the lid and the tap water within the can were removed. A spot of the film on the upper end part of the can was cut away to expose the steel sheet. The can was then filled with a 5% salt solution. A platinum electrode was inserted into the solution (the position inserted was the center of the can) as a cathode, with the upper end part of the can (the steel sheet exposed part) as an anode. Subsequently, a voltage of 6 V was applied across the platinum electrode and the can, and a current value after a lapse of 3 seconds was read. An average value after measuring the ten cans was calculated, and the impact resistance was evaluated based on the average value in accordance with the following criteria.

D: exceeding 1 mA
C: exceeding 0.1 mA and 1 mA or less
B: exceeding 0.01 mA and 0.1 mA or less
A: less than 0.01 mA The evaluation results are listed in Table 2. As listed in Table 2, the laminated steel sheets of Inventive Examples 1 to 25 have all of the drawing and ironing formability, the outer face coverability, the outer face retort whitening resistance, the inner face corrosion resistance, and the inner face impact resistance. In contrast, the laminated steel sheets of Comparative Examples 1 to 11 are inferior in any of the drawing and ironing formability, the outer face coverability, the outer face retort whitening resistance, the inner face corrosion resistance, and the inner face impact resistance. From the foregoing, it has been confirmed that the laminated steel sheets of Inventive Examples 1 to 25 can provide a laminated steel sheet having retort whitening resistance and corrosion resistance and having mechanical properties that enable forming with a high degree of processing such as drawing and drawing and ironing.

TABLE 2

|  | Drawing and ironing formability | Outer face coverability | Outer face retort whitening resistance | Inner face corrosion resistance | Inner face impact resistance |
| --- | --- | --- | --- | --- | --- |
| Inventive Example 1 | B | B | B | B | A |
| Inventive Example 2 | B | B | B | B | A |
| Inventive Example 3 | B | A | B | A | A |
| Inventive Example 4 | B | A | B | A | A |
| Inventive Example 5 | B | A | B | A | A |
| Inventive Example 6 | B | A | B | A | A |
| Inventive Example 7 | B | A | B | A | A |
| Inventive Example 8 | B | A | B | A | A |
| Inventive Example 9 | B | A | B | A | A |
| Inventive Example 10 | B | A | B | A | A |
| Inventive Example 11 | B | A | B | A | A |
| Inventive Example 12 | B | A | B | A | A |
| Inventive Example 13 | B | A | B | A | B |
| Inventive Example 14 | B | A | B | A | A |
| Inventive Example 15 | B | A | B | A | A |
| Inventive Example 16 | B | A | B | A | A |
| Inventive Example 17 | B | A | B | A | A |
| Inventive Example 18 | B | B | B | A | A |
| Inventive Example 19 | B | A | C | A | A |
| Inventive Example 20 | B | B | B | B | A |
| Inventive Example 21 | B | A | B | A | A |
| Inventive Example 22 | B | B | B | B | A |
| Inventive Example 23 | B | A | B | B | A |
| Inventive Example 24 | B | B | B | B | A |
| Inventive Example 25 | B | A | B | A | B |
| Comparative Example 1 | D | Unevaluated | Unevaluated | Unevaluated | Unevaluated |
| Comparative Example 2 | B | C | B | B | A |
| Comparative Example 3 | D | Unevaluated | Unevaluated | Unevaluated | Unevaluated |
| Comparative Example 4 | D | Unevaluated | Unevaluated | Unevaluated | Unevaluated |
| Comparative Example 5 | B | D | B | A | B |
| Comparative Example 6 | D | Unevaluated | Unevaluated | Unevaluated | Unevaluated |
| Comparative Example 7 | B | C | B | A | A |

TABLE 2-continued

|  | Drawing and ironing formability | Outer face coverability | Outer face retort whitening resistance | Inner face corrosion resistance | Inner face impact resistance |
|---|---|---|---|---|---|
| Comparative Example 8 | D | Unevaluated | Unevaluated | Unevaluated | Unevaluated |
| Comparative Example 9 | B | D | D | A | A |
| Comparative Example 10 | B | C | D | A | B |
| Comparative Example 11 | B | B | D | A | B |

An embodiment to which the invention made by the inventors of the present invention is applied has been described. The present invention is not limited by the description and drawings constituting part of the disclosure of the present invention by the embodiment. In other words, other embodiments, inventive examples, operating techniques, or the like made by those skilled in the art based on the embodiment are all included in the scope of the present invention.

The present invention can provide a laminated metal sheet for a two-piece can having retort whitening resistance and corrosion resistance and having mechanical properties that enable forming with a high degree of processing and a two-piece laminated can body manufactured by using the laminated metal sheet for a two-piece can.

The invention claimed is:

1. A laminated metal sheet for a two-piece can, the laminated metal sheet comprising:
a metal sheet;
a first polyester resin layer formed on a surface of the metal sheet, the surface forming an outer face side of a container after container formation; and
a second polyester resin layer formed on a surface of the metal sheet, the surface forming an inner face side of the container after container formation, wherein
the first polyester resin layer contains: a polyethylene terephthalate polymer with a content of a copolymerized component of less than 6 mol % in a ratio of 30% to 60% by mass with respect to the first polyester resin layer, a polybutylene terephthalate polymer with a content of a copolymerized component of less than 5 mol % in a ratio of 40% to 70% by mass with respect to the first polyester resin layer, and a polyolefinic wax in an amount of 0.01% to 3.0% by mass with respect to the first polyester resin layer,
the second polyester resin layer is a copolymerized polyethylene terephthalate with a content of a copolymerized component of less than 22 mol %,
residual degrees of orientation of the first and the second polyester resin layers are less than 30%, and
the difference between the residual degrees of orientation of the first polyester resin layer and the residual degrees of orientation of the second polyester resin layer is an absolute value of equal to or less than 10%.

2. The laminated metal sheet for a two-piece can according to claim 1, wherein a center line surface roughness Ra of a surface of the first polyester resin layer is within a range of 0.4 μm to 2.0 μm.

3. The laminated metal sheet for a two-piece can according to claim 1, wherein the polyolefinic wax is a low molecular weight wax with a number-average molecular weight (Mn) of 1,000 to 10,000.

4. The laminated metal sheet for a two-piece can according to claim 1, wherein polyethylene terephthalate polymer is a copolymer having a melting point temperature of 210° C. to 256° C.

5. The laminated metal sheet for a two-piece can according to claim 1, wherein polybutylene terephthalate polymer is a copolymer having a melting point temperature of 180° C. to 223° C.

6. The laminated metal sheet for a two-piece can according to claim 1, wherein the first polyester resin layer has a melting point temperature of 200° C. to 256° C.

7. A two-piece laminated can body, comprising:
a laminated metal sheet comprising:
a metal sheet;
a first polyester resin layer formed on a surface of the metal sheet, the surface forming an outer face side of a container after container formation; and
a second polyester resin layer formed on a surface of the metal sheet, the surface forming an inner face side of the container after container formation, wherein
the first polyester resin layer contains: a polyethylene terephthalate polymer with a content of a copolymerized component of less than 6 mol % in a ratio of 30% to 60% by mass with respect to the first polyester resin layer, a polybutylene terephthalate polymer with a content of a copolymerized component of less than 5 mol % in a ratio of 40% to 70% by mass with respect to the first polyester resin layer, and a polyolefinic wax in an amount of 0.01% to 3.0% by mass with respect to the first polyester resin layer,
the second polyester resin layer is a copolymerized polyethylene terephthalate with a content of a copolymerized component of less than 22 mol %,
residual degrees of orientation of the first and the second polyester resin layers are less than 30%, and
the difference between the residual degrees of orientation of the first polyester resin layer and the residual degrees of orientation of the second polyester resin layer is an absolute value of equal to or less than 10%.

8. The two-piece laminated can body according to claim 7, wherein a center line surface roughness Ra of a surface of the first polyester resin layer is within a range of 0.4 μm to 2.0 μm.

9. The two-piece laminated can body according to claim 7, wherein the polyolefinic wax is a low molecular weight wax with a number-average molecular weight (Mn) of 1,000 to 10,000.

10. The two-piece laminated can body according to claim 7, wherein polyethylene terephthalate polymer is a copolymer having a melting point temperature of 210° C. to 256° C.

11. The two-piece laminated can body according to claim 7, wherein polybutylene terephthalate polymer is a copolymer having a melting point temperature of 180° C. to 223° C.

12. The two-piece laminated can body according to claim 7, wherein the first polyester resin layer has a melting point temperature of 200° C. to 256° C.

* * * * *